United States Patent
Jin et al.

(10) Patent No.: US 9,571,614 B2
(45) Date of Patent: Feb. 14, 2017

(54) APPARATUS USING HALL SENSOR

(71) Applicant: Magnachip Semiconductor, Ltd., Cheongju-si (KR)

(72) Inventors: Hyung-nam Jin, Sejong-si (KR); Seung-hwan Park, Cheongju-si (KR); Eunjoong Kim, Namyangju-si (KR)

(73) Assignee: Magnachip Semiconductor, Ltd., Cheongju-si (KR)

( * ) Notice: Subject to any disclaimer, the term of this patent is extended or adjusted under 35 U.S.C. 154(b) by 0 days.

(21) Appl. No.: 14/323,418

(22) Filed: Jul. 3, 2014

(65) Prior Publication Data

US 2015/0115943 A1 Apr. 30, 2015

(30) Foreign Application Priority Data

Oct. 29, 2013 (KR) .................. 10-2013-0129603

(51) Int. Cl.
  *G01N 27/72* (2006.01)
  *G01R 33/00* (2006.01)
  *H04M 1/02* (2006.01)

(52) U.S. Cl.
  CPC .................. *H04M 1/0245* (2013.01)

(58) Field of Classification Search
  CPC ........... G01D 5/145; G01B 7/003; G01B 7/14; G01B 7/30; H04M 1/024; H04M 1/0206; H04M 1/0245; H04M 1/00; H04M 1/02; H04M 1/10; H04M 1/725; H05K 5/03; G06F 1/1677; G06F 2200/1634; G06F 3/00; G06F 3/041; G01R 33/0005; G01R 33/07; G01R 33/072; G01R 33/02; G01R 33/06; G01C 17/38

USPC ........................ 324/207.2, 226, 156, 207.11, 207.21,324/207.25, 207.26, 251, 260, 200, 207.13,324/207.22; 455/90.3, 128, 575.8, 575.1, 575.3, 455/566; 345/111, 156; 361/679.26, 679.27; 33/355, 356, 730; 309/679, 730; 335/78, 335/84, 85, 108, 167, 170, 177, 179, 182, 192, 335/202, 205, 207, 229; 301/679, 730

See application file for complete search history.

(56) References Cited

U.S. PATENT DOCUMENTS

| | | | |
|---|---|---|---|
| 6,701,166 B2 | 3/2004 | Lim | |
| 2006/0097715 A1* | 5/2006 | Oohira | G01R 33/066 324/207.2 |
| 2007/0089311 A1* | 4/2007 | Amundson | G01C 17/28 33/355 R |
| 2010/0298032 A1* | 11/2010 | Lee | G06F 1/1616 455/566 |
| 2013/0076614 A1* | 3/2013 | Ive | G06F 1/1677 345/156 |

* cited by examiner

*Primary Examiner* — Arleen M Vazquez
*Assistant Examiner* — Steven Yeninas
(74) *Attorney, Agent, or Firm* — NSIP Law

(57) ABSTRACT

An apparatus and a method of determining a status of a cover of a display terminal are provided. The apparatus includes a terminal comprising a display screen, and a Hall sensor comprising a magnetic field sensing surface and a plurality of Hall elements disposed substantially parallel with the magnetic field sensing surface, the magnetic field sensing surface being substantially perpendicular to the display screen.

17 Claims, 11 Drawing Sheets

APPARATUS USING HALL SENSOR

CROSS-REFERENCE TO RELATED APPLICATIONS

This application claims the benefit under 35 USC 119(a) of Korean Patent Application No. 10-2013-0129603 filed on Oct. 29, 2013, in the Korean Intellectual Property Office, the entire disclosure of which is incorporated herein by reference for all purposes.

BACKGROUND

1. Field

The following description relates to a sensing system using a Hall sensor and to a Hall sensor arrangement procedure in a terminal including a display screen.

2. Description of Related Art

U.S. Pat. No. 6,701,166 relates to a switch that detects an open or closed state of a flip-type or folder-type radio terminal that has first and second structures joined to each other to have an open or closed state. The switch includes a Hall sensor that generates voltage according to the strength of an input magnetic field and inversely proportional to the distance to a magnet, a variable amplifier that variably amplifies the voltage from the hall sensor to output a variably amplified voltage signal in response to a control signal, and a comparator that compares the signal from the variable amplifier with a reference voltage to output a signal that indicates whether the terminal is in an open state or a closed state. The sensing value of the switch may be adjusted to sense the opening or closing of a folder of a terminal.

While the use of a Hall sensor to detect whether the flip cover opens or closes is discussed, a mechanism of preventing inaccurate detection when an angle of opening of a flip cover reaches about 360 degrees is not discussed in the patent.

In the event that the angle of opening of a flip cover is 0 degree, a magnet is close to the Hall sensor and the Hall sensor may detect a strong magnetic field. In response to the detection of the strong magnetic field, the Hall sensor may be used to determine that the flip cover is in a closed state.

However, in the event that the angle of opening of the flip cover reaches 360 degrees, a magnet is also located close to the Hall sensor. Thus, a strong magnetic field may be detected by the Hall sensor. A shielding sheet may be used to block the magnetic field from the Hall sensor.

The shielding sheet may be produced through a metallic material blocking a magnetic field flow. In response to the angle of opening of the flip cover being about 360 degrees, the shielding sheet may block the magnetic field generated from the magnet 210 so that the full strength of the magnetic field may not be detected by the Hall sensor. When the Hall sensor does not sense the strong magnetic field due to the blocking of the magnetic filed by the shielding sheet, the flip cover 200 may be continuously determined to be in an open state.

However, the procedure of determining the state of the flip cover using the shielding sheet additionally requires the use of a shielding sheet and may result in inaccurately determining an open state of the flip cover according to a position of the shielding sheet. Furthermore, a production of a display terminal requires an additional procedure of including the shielding sheet, which results in an increase in production cost.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus including a terminal comprising a display screen, and a Hall sensor comprising a magnetic field sensing surface and a plurality of Hall elements disposed substantially parallel with the magnetic field sensing surface, the magnetic field sensing surface being substantially perpendicular to the display screen.

The apparatus may further include a cover unit configured to cover the display screen, and a magnet disposed in or on the cover unit.

The plurality of the Hall element may be formed on a semiconductor substrate, and a first conductivity type contact region and a second conductivity type doping region may be formed on a first conductivity type well of the semiconductor substrate.

The first conductivity type contact region may be an N-type contact region. The second conductivity type doping region may be a P-type doping region. The first conductivity type well may be an N well of the semiconductor substrate.

The apparatus may further include an offset adjustment unit configured to determine a reference value for a magnetic field intensity detected by each of the plurality of the Hall elements, an amplification unit configured to amplify the magnetic field intensity detected by each of the plurality of the Hall elements, and a comparison unit configured to compare the detected magnetic field intensity through each of the plurality of the Hall elements.

A number of the Hall elements may be equal to 2 or more.

The Hall sensors may be disposed on a Hall sensor circuit board, and the Hall sensor circuit board may be disposed in a packaged chip.

The Hall sensor circuit board may be arranged substantially perpendicular to the display screen.

In another general aspect, an apparatus includes a display terminal comprising a display screen, a first Hall sensor comprising a first Hall element, and a second Hall sensor comprising a second Hall element, in which the display screen is arranged substantially parallel to a magnetic field sensing surface of the first Hall sensor and to a magnetic field sensing surface of the second Hall sensor.

The first Hall element and the second Hall element may be on a semiconductor substrate, and a first conductivity type contact region and a second conductivity type doping region may be formed on a first conductivity type well of the semiconductor substrate.

The first conductivity type contact region may be an N-type contact region. The second conductivity type doping region may be a P-type doping region. The first conductivity type well may be an N well of the semiconductor substrate.

The first Hall sensor may be layered above or below the second Hall sensor.

The apparatus may further include a cover including a magnet, and a processor configured to determine whether the cover is open or closed based on magnetic fields detected by the first Hall sensor and the second Hall sensor.

In another general aspect, there is provided a method of determining a status of a cover of a display terminal, the display terminal including at least two Hall elements arranged vertically inside the display terminal, the method involving detecting a first magnetic field intensity by using a first Hall element, detecting a second magnetic field intensity by using a second Hall element, comparing the first magnetic field intensity and the second magnetic intensity, and determining whether the cover is open or closed based a result of the comparing.

Other features and aspects will be apparent from the following detailed description, the drawings, and the claims.

Figure 1A:
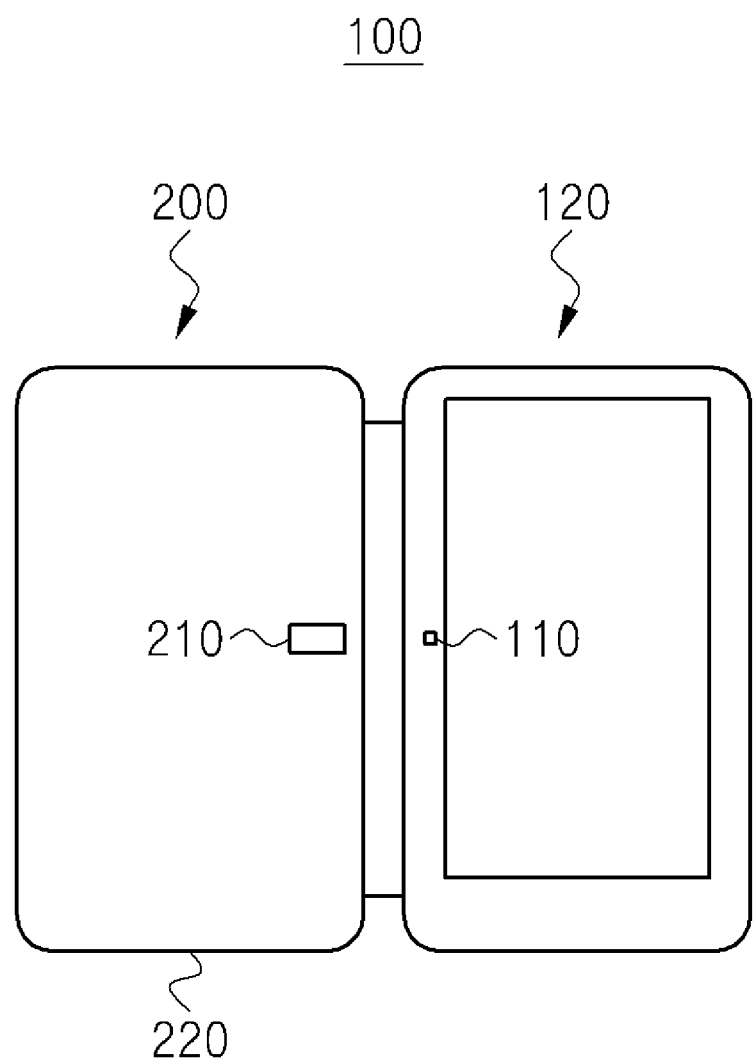
FIG. 1A is a diagram illustrating an example of a terminal including a display screen and a flip cover or a smart cover.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Terms used in the present disclosure may be understood as follows.

While terms such as "first" and "second," etc., may be used to describe various components, such components must not be understood as being limited to the above terms. The above terms are used to distinguish one component from another. Structural differences between the components are not necessary. For example, a first component may be referred to as a second component, and likewise a second component may be referred to as a first component.

It will be understood that, when an element is referred to as being "connected to" another element, the element may be directly connected to the another element or intervening elements may be present therebetween. In contrast, when an element is referred to as being "directly connected to" another element, no intervening elements are present therebetween. In addition, unless explicitly described to the contrary, the word "comprise" and variations such as "comprises" or "comprising," will be understood to imply the inclusion of stated elements but not the exclusion of any other elements. Meanwhile, other expressions describing relationships between components such as "between", "immediately between" or "adjacent to" and "directly adjacent to" may be construed similarly.

Singular forms "a", "an" and "the" in the present disclosure are intended to include the plural forms as well, unless the context clearly indicates otherwise. It will be further understood that terms such as "including" or "having," etc., are intended to indicate the existence of the features, numbers, calculation s, actions, components, parts, or combinations thereof disclosed in the specification, and are not intended to preclude the possibility that one or more other features, numbers, calculation s, actions, components, parts, or combinations thereof may exist or may be added.

In describing the elements of the present invention, terms such as first, second, A, B, (a), (b), etc., may be used. Such terms are used for discriminating the corresponding elements from other elements and the corresponding elements are not intended to limit their essence, sequence, or precedence.

Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present application.

Proposed below are various examples of sensing systems capable of sensing a magnetic field being generated by a magnet of a flip cover without a separate shielding sheet to detect a status of a flip cover. Also, proposed below are various examples of sensing systems capable of detecting an open operation of a flip cover based on the intensities of magnetic filed sensed by a plurality of Hall elements in a Hall sensor.

The examples of sensing systems described below may be capable of lowering the possibility of malfunction that may occur when an angle of opening of a flip cover reaches 360 degrees. However, the present disclosure is not limited thereto.

FIG. 1A is a diagram illustrating an example of a terminal including a display apparatus and a flip cover or a smart cover.

Referring to FIG. 1A, a display apparatus 100 corresponding to a first body that includes a main body 120. A Hall sensor is arranged in the main body 120. A flip cover or smart cover 200 corresponding to a second body, and includes a magnet 210 and a cover unit 220. The display apparatus 100 and the flip cover 200 may be separately implemented or integrally implemented. In one example, the flip cover 200 may be detached from the main body 120. The flip cover 200 may be directly coupled to the body of display apparatus 100 or be extended from a battery cover in a back of the display apparatus 100.

The display apparatus 100 corresponds to a device capable of a display function. The display apparatus 100 has a display screen 121 that may output various information to a user. The display apparatus 100 may correspond to a device configured for a wireless communication, such as a cellphone, a smartphone, a tablet or a two-way radio. The display apparatus 100 includes the Hall sensor 100, the main body 120 and the display screen 121. The display apparatus 100 may be included in a sensing system that detects a state of a flip cover 200 through the use of the Hall sensor 110.

Herein, the display screen 121 may correspond to a front surface of the display apparatus 100. The display screen 121 may illustrate various information and functions. The display screen 121 may illustrate a difference between a magnetic field sensed by the Hall sensor 110, an open angle of the flip cover 200 and a sensing result of the Hall sensor 110 of the various functions. That is, the display screen 121 may correspond to a screen illustrating a function of the Hall sensor 200.

The Hall sensor 110 or a chip including the Hall sensor 110 may detect the magnetic field being generated by the magnet 210 in the flip cover 200. The Hall sensor 110 may include a plurality of Hall elements, a logic circuit and a memory.

The Hall sensor 110 may be implemented as a rectangular shape and may include at least one Hall element may be included in the Hall sensor 110. A plurality of Hall elements may be symmetrically arranged at each corner of the Hall sensor 110 to maintain a constant distance.

Each of the plurality of Hall elements may be formed on a semiconductor substrate. The semiconductor substrate may have an N-well region. A plurality of high concentration N-type contact regions and high concentration P-type doping regions may be arranged thereon. The concentrations of dopant in the high concentration N-type contact regions may be greater than the concentration of dopant in the N-well region. The high concentration P-type doping regions may be arranged between the high concentration N-type contact regions. For example, in the event that a number of the Hall element is (4) four, four N-type contact regions may be provided. The plurality of the high concentration N-type contact regions is used to flow a current and to measure a voltage variation.

The at least one Hall element uses the Hall effect to measure a direction and an intensity of a magnetic field. The Hall effect refers to the generation of a voltage difference (the Hall voltage) across an electrical conductor, transverse to an electric current in the conductor and a magnetic field perpendicular to the current. The Hall voltage is proportional to an amount of the electric current and the magnetic field strength; in the event that the amount of the electric current is constant, the Hall voltage is proportional to the magnetic field strength.

The main body 120 includes a display screen and a wireless transceiver for a wireless communication.

The flip cover 200 may correspond to a structure for protecting a display screen and improving the appearance of a display apparatus 100. The flip cover 200 may protect the display apparatus 100 from a scratch or a damage that may result from inadvertent dropping of the display apparatus 100. The flip cover 200 may include a magnet 210 that generates a magnetic field and the cover unit 220 that covers a front surface of the display apparatus 100. The act of opening or closing the flip cover 200 may generate a variation in the magnetic field originating from the magnet 210, and the variation of the magnetic field may be detected by the Hall sensor 110 of the display apparatus 100.

The magnet 210 may form a magnetic field around the Hall sensor 110. The magnet 210 is attached with the cover unit 220 to move according to a movement of the cover unit 220. Thus, the magnetic field of around the Hall sensor 110 is changed according to the movement of the cover unit 220.

The cover unit 220 may protect the front side of the display apparatus 100 and may internally or an externally include the magnet 210. The cover unit 220 may use a hinge 221 to be coupled with the display apparatus 100.

Figure 1B:
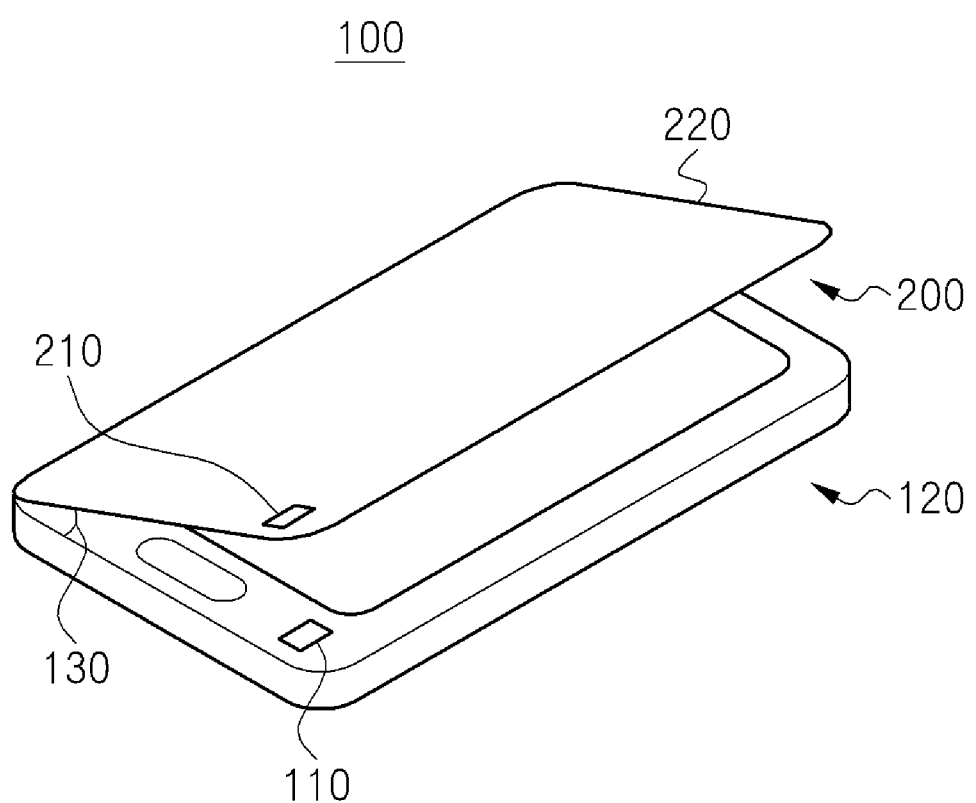
FIG. 1B is a diagram illustrating another example of a terminal including a display screen and a flip cover or a smart cover.

As illustrated in FIG. 1B, the cover unit 220 may be opened or closed according to a user's usage. In the event that the cover unit 220 is completely covering the display apparatus 100, an angle of opening 130 is considered to be 0 degree. In the event that the cover unit 220 reaches a back side of the display apparatus 100, the angle of opening 130 may be considered to be about 360 degrees.

A distance between the Hall sensor 110 and the magnet 210 included in the cover unit 220 is substantially the same when the angle of opening 130 of the cover unit 220 is about 0 degree as when the angle of opening 130 of the cover unit 220 is about 360 degrees. This may cause the Hall sensor 110 to inaccurately detect a state of the cover unit 220, such as whether the cover unit 220 is in an open state or in a closed state. That is, although the angle of opening of the flip cover 200 is about 0 degree, the Hall sensor 110 may detect the angle of opening 130 thereof to be about 360 degrees. In order to prevent this situation, a mechanism is necessary to allow the Hall sensor 110 to discriminate between the two angles of opening 130 of the cover unit 220. That is, when the angle of opening of the cover unit 220 is about 360 degrees, a mechanism is necessary for the Hall sensor 110 to detect that the cover unit 220 is in an open state and not in a closed state.

In the event that the angle of opening of the cover unit 220 is about 360 degrees, a mechanism is necessary for the display apparatus 100 to detect that the cover unit 220 is in an open state and not a closed state. In one example, the mechanism is based on a vertical arrangement of the Hall sensor 110 in the display apparatus 100. An example of a display apparatus in which the Hall sensor 110 is in a vertical arrangement will be described with respect to FIG. 2. However, in another example, the Hall sensor 110 may be arranged in the cover unit 220 and the magnet may be arranged in the display apparatus 100.

Figure 2:
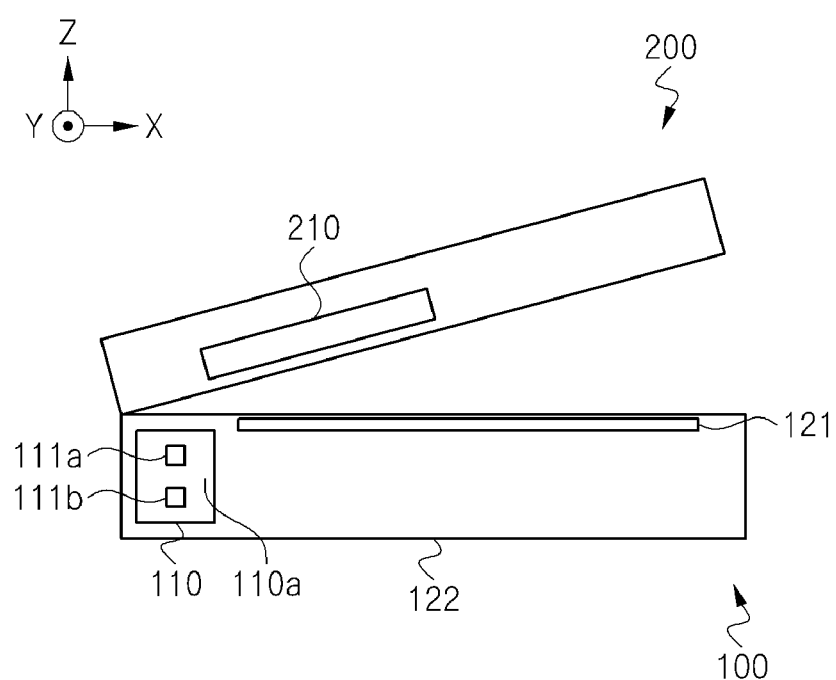
FIG. 2 is a diagram illustrating an example for a terminal including a Hall sensor having a plurality of Hall elements.

FIG. 2 is a diagram illustrating an example of a terminal including a Hall sensor. In this example, the Hall sensor includes a plurality of Hall elements.

Referring to FIG. 2, the display apparatus 100 may include a single Hall sensor 110. A corresponding Hall sensor 110 may include first and second Hall elements 111a and 111b. The corresponding Hall sensor 110 may include a magnetic field sensing surface 110a, and the magnetic field sensing surface 110a is arranged perpendicular to the main surface of the display screen 121. Therefore, a plurality of Hall elements 111a and 111b are arranged perpendicular to the display screen 121, due to the vertical arrangement of the corresponding Hall sensor 110. That is, when the magnetic field sensing surface 110a is facing a first direction, the display screen 121 is arranged to face a second direction such that the second direction is perpendicular to the first direction.

In an example in which the Hall sensor 110 is arranged perpendicular to the display screen 121, each of the plurality of the Hall elements 111a and 111b may have different distances from the display screen 121, unlike in an example in which the Hall sensor is arranged parallel to the display screen 121. In the illustrated example, because the first Hall element 111a is located closer to the magnet 210 than the second Hall element 111b, the first Hall element 111a detects a greater magnetic field intensity in comparison to the second Hall element 111b. A difference between the magnetic field intensities detected by the plurality of the Hall elements 111a and 111b may be used to determine the angle of opening 130 of the flip cover 200, as well as the state of the flip cover 200.

In the illustrated example, the plurality of the Hall elements 111a and 111b in the Hall sensor 110 is arranged on a same plane. However, the plurality of the Hall elements 111a and 111 b are arranged vertically, perpendicular to the display screen 121. Thus, the magnetic field intensity detected by each of the plurality of the Hall elements varies due to the distance. When the angle of opening 130 of the flip cover 200 is 180 degrees, magnetic field intensities detected by two Hall elements 111a and 111b may be substantially same. However, when the open angle 130 corresponds to 0 degree or to 360 degrees (not 180 degree), the magnetic field intensities detected by each of the two Hall elements 111a and 111b are different due to the vertical arrangement of the Hall elements 111a and 111b.

For example, in the event that the flip cover 200 having the magnet 210 is arranged above the first Hall element 111a while the angle of opening 130 is 0 degree, a magnetic field intensity detected by the first Hall element 111a is stronger than that detected by the second Hall element 111b. On the other hand, in the event that the flip cover 200 having the magnet 210 rotates 360 degrees to reach the back side of the display apparatus 100, a magnetic field intensity detected by the second Hall element 111b is stronger than that detected by the first Hall element 111a.

The display apparatus 100 may use a difference between the magnetic field intensities of the first and second Hall elements 111a and 111b to discriminate as to whether the angle of opening 130 of the flip cover 200 corresponds to 0 degree or to 360 degrees. For example, the display apparatus 100 may determine the angle of opening 130 of the flip cover 200 as 360 degrees when a magnetic field intensity sensed by the second Hall element 111b is at its maximum level. On the other hands, when a magnetic field intensity detected by the first Hall element 111a is at its maximum, the display apparatus 100 may determine the angle of opening 130 of the flip cover 200 to be 0 degree.

FIGS. 3A, 3B, 3C and 3D are diagrams illustrating examples of display circuit boards or Hall sensor circuit boards having a vertical arrangement of a Hall sensor. The Hall sensors include a plurality of Hall elements. FIGS. 4A and 4B are diagrams illustrating examples of package-type semiconductor die or semiconductor chip including a Hall sensor mounted on a display circuit board or a Hall sensor circuit board.

Figure 3A:
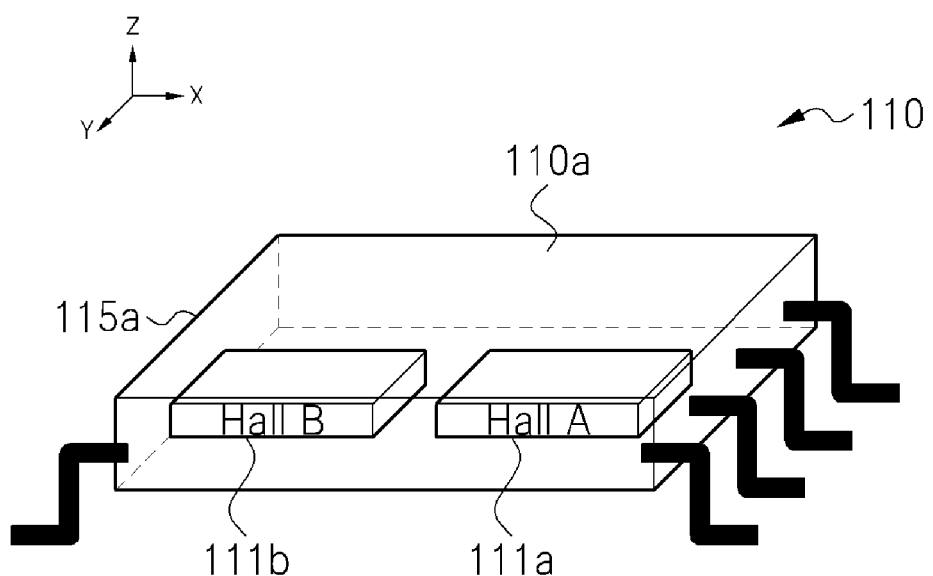
FIGS. 3A, 3B, 3C and 3D are diagrams illustrating examples of display circuit boards or Hall sensor circuit boards having a vertical arrangement of a Hall sensor including a plurality of Hall elements.
Figure 3B:
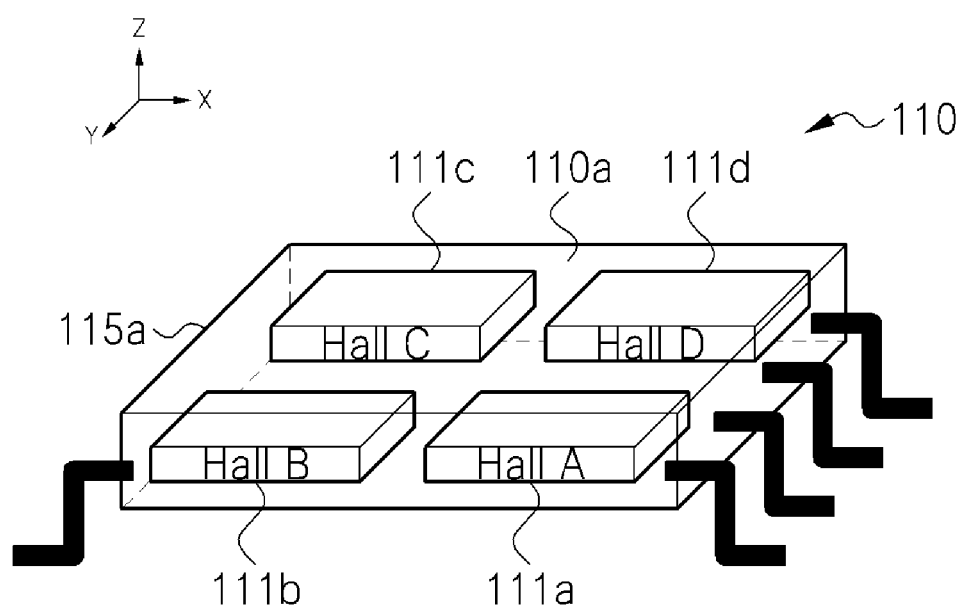

FIGS. 3A, 3B, 3C, 3D illustrate examples of Hall sensors including a plurality of the Hall elements. In FIG. 3A, the Hall sensor 110 includes two Hall elements 111a and 111b. In FIG. 3B, the Hall sensor 110 includes four Hall elements 111a through 111d. The Hall elements in the Hall sensor 110 may correspond to at least two Hall elements. Because a difference between the magnetic field intensities sensed by each of the plurality of the Hall elements may be used to detect the angle of opening 130 of the flip cover 200, when two Hall elements 111a and 111b are arranged as in the example illustrated in FIG. 3A, the two Hall elements may be respectively arranged on a left side and a right side of the Hall sensor 110. In another example, the two Hall elements 111a and 111b may be diagonally arranged instead of the left side and the right side of the Hall sensor. In this example, the Hall elements 111a through 111d are formed on a single semiconductor substrate. The plurality of the Hall elements 111a through 111d may be integrated to form a single Hall sensor 110.

FIG. 3B illustrates an example in which the Hall sensor 110 includes four Hall elements, the plurality of the Hall elements 111a through 111d are arranged at each corners of the Hall sensor 110 so that the Hall sensor 110 may obtain various information. The arrangement allow comparison of the magnetic field along the y-axis and x-axis and in the diagonal direction through the x-axis and y-axis. Thus, more information may be obtained in comparison to a Hall sensor having two Hall elements. The Hall sensor may extend a sliding prevention function as well as an angle of opening calculation function.

The plurality of the Hall elements 111a through 111d may respectively detect the magnetic field intensities generated from the magnet 210. The plurality of the Hall elements 111a through 111d represent a same or similar electrical property when the plurality of the Hall elements 111a through 111d are manufactured in a same procedure.

The magnetic field sensing surface 110a of the Hall sensor 110 is packaged toward a Z-axis direction. The plurality of the Hall elements 111a through 111d may collect the magnetic field intensity flowing through the magnetic field sensing surface 110a of the Hall sensor 110.

Figure 3C:
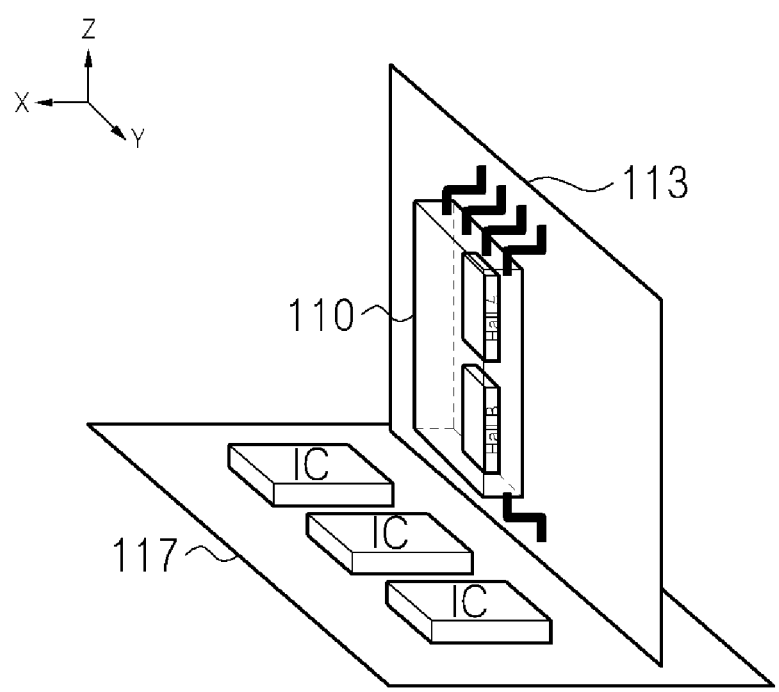
Figure 3D:
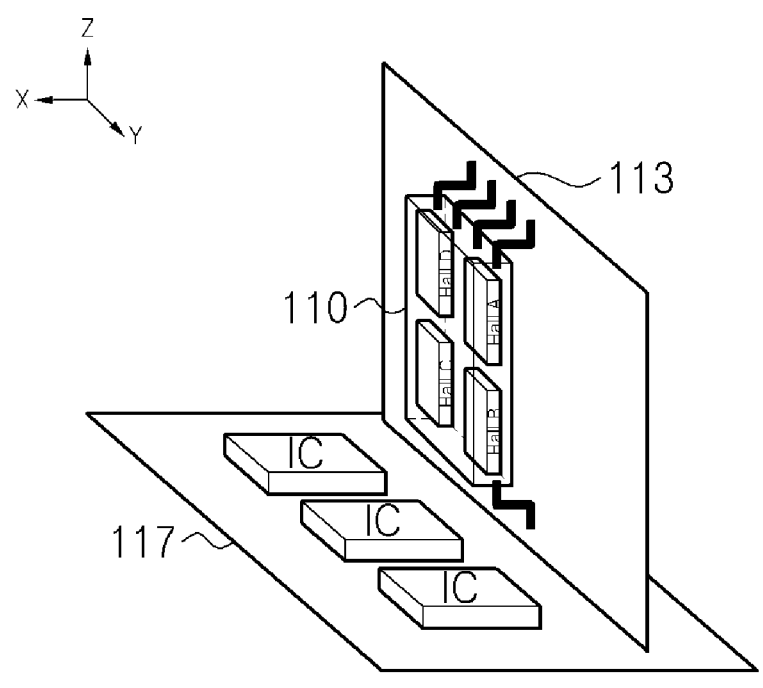
Figure 4A:
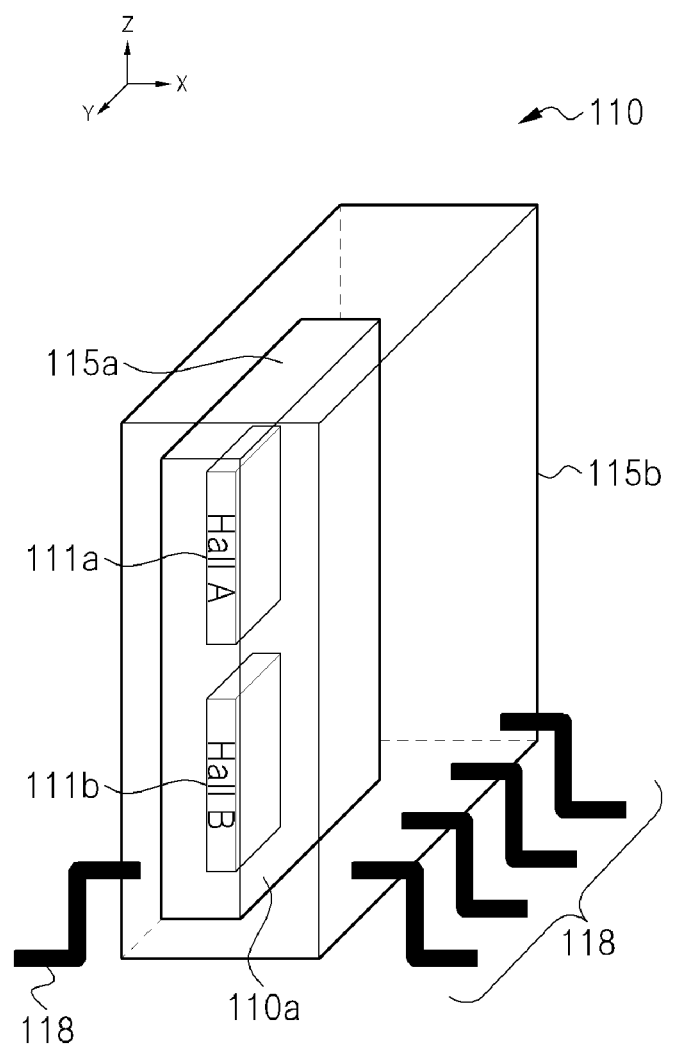
FIGS. 4A and 4B are diagrams illustrating examples of package-type semiconductor die or semiconductor chip including a Hall sensor mounted on a display circuit board or a Hall sensor circuit board.
Figure 4B:
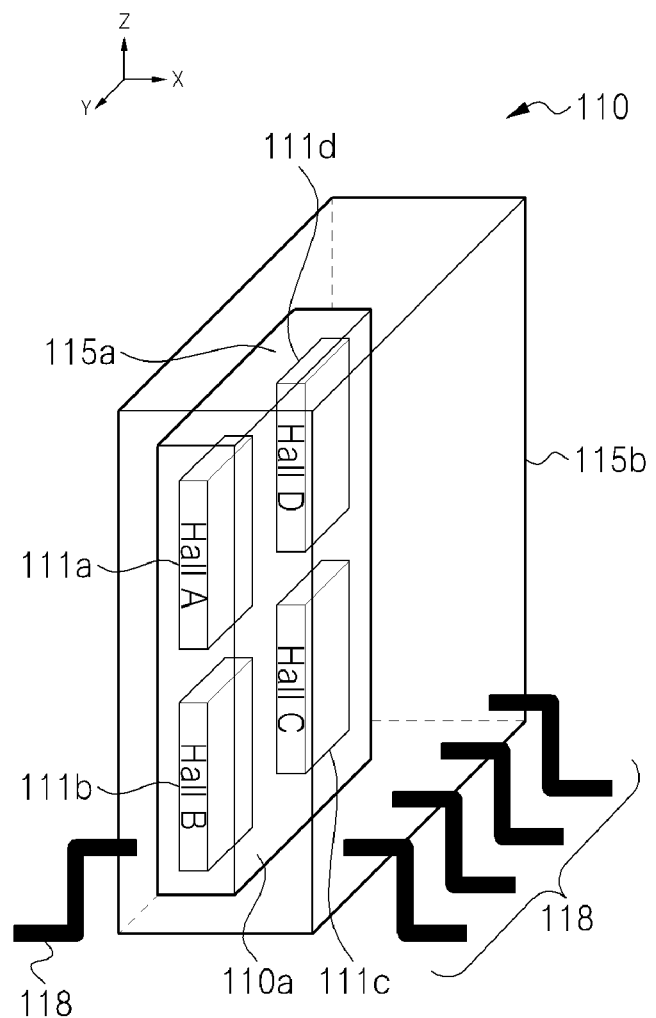

As illustrated in FIGS. 3C and 3D, the Hall sensors 110 are mounted on a Hall sensor circuit board 113. The Hall sensor circuit board 113 may be used to transmit a signal to the display apparatus 100. The mounted Hall sensor circuit board 113 (e.g., a Printed Circuit Board) may be arranged perpendicular to the display screen 121 inside a display apparatus 100. The plurality of the Hall elements 111a through 111d may be arranged on the Hall sensor 110 so that the plurality of the Hall elements 111a through 111d may be arranged perpendicular to the display screen 121.

As illustrated in FIGS. 3C and 3D, the magnetic field sensing surface 110a in the Hall sensor 110 is arranged perpendicular to the display screen 121 so that a surface of the magnet 210 is vertically arranged on the Hall sensor 110. The magnet 210 is mounted on the flip cover 200. When the angle of opening 130 of the flip cover 200 is 0 degree and the flip cover 200 covers the display screen 121, the magnetic field sensing surface 110a of the Hall sensor 110 and the magnet 210 may be substantially perpendicular to each other. Herein, the term substantially perpendicular refers to the angle between two surfaces or lines being approximately 90 degrees. For example, the angle between the two surfaces or lines may be between approximately 80 to 100 degrees, or between 85 to 95 degrees. Likewise, a parallel surface or two horizontal surfaces may have an angle of approximately 0 degree, 180 degrees or 360 degrees. Degrees deviating by approximately 5 to 10 degrees, such as 0 to 5 degrees, 175 to 185 degrees, 355 to 365 degrees may be considered as being substantially parallel.

That is, when the angle of opening 130 of the flip cover 200 is 0 degree or 360 degrees, the magnetic field sensing surface 110a of the Hall sensor 110 may be substantially perpendicular to the magnet 210. In addition, the magnetic field sensing surface 110a may be substantially perpendicular to the display screen 121, and the magnetic field sensing surface 110a may be vertical to a main circuit board 117 of the display apparatus 100 so that the Hall sensor 110 may determine whether the angle of opening 130 of the flip cover 200 is approximately 0 degree or 360 degrees without a separate shielding sheet.

In this example, a semiconductor die or a semiconductor package chip 115a having the Hall sensor 110 is mounted on the Hall sensor circuit board 113 and the Hall sensor circuit board 113 is arranged perpendicular to the display screen 121. As a result, the magnetic field sensing surface 110a of the Hall sensor 110 is arranged in an X-axis direction (or a Y-axis direction). Herein, the main circuit board 117 and the Hall sensor circuit board 113 of the display apparatus 100 are perpendicular to each other.

In one embodiment, a semiconductor chip having the Hall sensor 110 may not use the Hall sensor circuit board 113 and may be directly mounted on the main circuit board 117 of the display apparatus 100. The Hall elements may be arranged perpendicular to the display screen 121.

In an example in which the plurality of the Hall elements 111a through 111d is arranged perpendicular to the display screen 121 due to a vertical arrangement of the Hall sensor 110, the magnetic field intensities detected by each of the plurality of the Hall elements 111a through 111d may vary based on its distance to the magnet 210.

The intensity of magnetic field detected by Hall elements that are arranged close to the magnet 210 is relatively strong and that detected by Hall elements far away from the magnet 210 is relatively weak. This difference in detected intensity allows the display apparatus 100 to determine the open or closed status of the flip cover 200.

FIGS. 4A and 4B illustrate a package type semiconductor die or semiconductor chip having a Hall sensor.

The plurality of the Hall elements 111a through 111d may be vertically arranged in during the packaging procedure.

In FIGS. 4A and 4B, the Hall sensor 110 may include two 111a and 111b or four Hall elements 111a through 111d. The magnetic field sensing surface 110a of the Hall sensor 110 is packaged in an X-axis direction or a Y-axis direction. A plastic package 115b packaging the semiconductor die 115a having the Hall sensor 110 may be mounted on the main circuit board 117 of the display apparatus 100 horizontally arranged on the display screen 121. As a result, the magnetic field sensing surface 110a of the Hall sensor 110 is arranged in an X-axis direction or a Y-axis direction.

Referring to FIG. 4A, the magnetic field intensity detected by each of the first and second Hall elements 111a and 111b may be different. The difference may result from the fact that a distance between each of the first and second Hall elements 111a and 111b and the magnet 210 is different. Therefore, the Hall sensor 110 may determine the angle of opening 130, a position of the flip cover 200 or a position of a N-pole and a S-pole of the magnet 210.

Referring to FIG. 4B, the first and fourth Hall elements 111a and 111 d are horizontally positioned, and the second and third Hall elements 111b and 111c are horizontally positioned. When the flip cover 200 having the magnet 210 is positioned above the first and fourth Hall elements 111a and 111d due to the angle of opening 130 being 0 degree, the magnetic field intensity detected by the first and fourth Hall elements 111a and 111 d may be stronger than the intensity detected by the second and third Hall elements 111b and 111 c. On the other hands, when the flip cover 200 having the magnet 210 rotates 360 degrees to position the magnet 210 close to the second and third Hall elements 111b and 111 c due to a flip cover rotation of 360 degrees, the magnetic field intensity detected by the second and third Hall elements 111b and 111 c may be stronger than that detected by the first and fourth Hall elements 111a and 111 d.

The Hall sensor 110 may determine whether the angle of opening 130 of the flip cover 200 is 0 degree or 360 degrees by using the difference of the magnetic field. For example, when the magnetic field intensities detected by the second and third Hall elements 111b and 111 c are maximum, the open angle 130 detected by the Hall sensor 110 may be set as 360 degrees. On the other hands, when the magnetic field intensity detected by the first and fourth Hall elements 111a and 111d is maximum, the Hall sensor 110 may determine the open angle 130 as 0 degree. A method of determining the opening status of the flip cover 200 will be described with respect to FIGS. 5 and 6.

Figure 5:
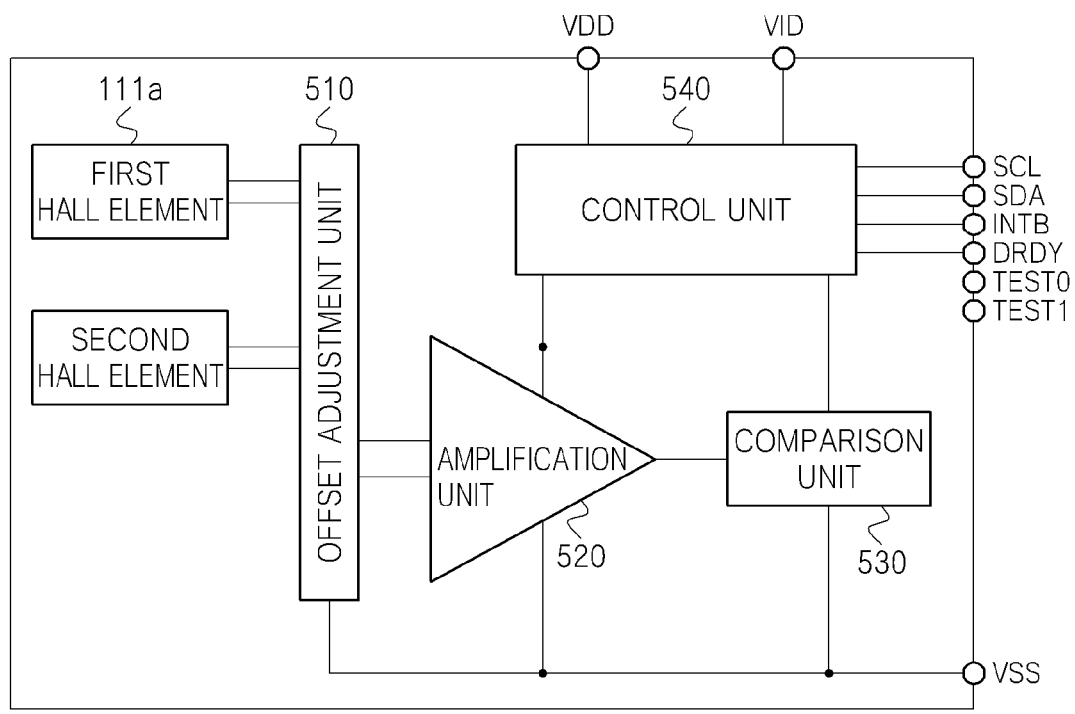
FIG. 5 is a block diagram illustrating an example of a display apparatus that detects the state of a flip cover.

FIG. 5 is a block diagram illustrating an example of a display apparatus that detects a flip cover.

Referring to FIG. 5, the display apparatus 100 includes a plurality of the Hall elements 111a through 111d, an offset adjustment unit 510, an amplification unit 520, a comparison unit 530 and a control unit 540.

In FIG. 5, the first and second Hall elements 111a and 111b may be arranged perpendicular to the display screen 121. The magnetic field intensity detected by the first and second Hall elements 111a and 111b may maintain a constant rate according to the distance between these and the magnet 210. A corresponding difference of the magnetic field may be used for determining the status of the flip cover 200, such as whether the flip cover 200 is open or closed.

The offset adjustment unit 510 adjusts the magnetic field intensities detected by each of the plurality of the Hall elements 111a through 111d. A magnetic field sensing property of each of the plurality of the Hall elements 111a through 111d may be different in a manufacturing procedure or a packaging procedure. Therefore, the plurality of the Hall elements 111a through 111d adjusts the offset for a predetermined reference value so that accuracy for sensing the open status of the flip cover 200 may be increased.

For example, in the event that the first and second Hall elements 111a and 111b are positioned at substantial the same distance from an identical magnet 210, the first Hall element 111a may detect 20 mT as the magnitude of a magnetic field and the second Hall element 111b may detect 30 mT as the magnitude of the magnetic field. The offset adjustment unit 510 may adjust an offset of +10 mT to the magnetic field intensity detected by the first Hall element 111a or an offset of −10 mT to the magnetic field intensity detected by the second Hall element 111b. As a result, the offset adjustment unit 510 causes the plurality of the Hall elements 111a through 111d having a substantial same distance from a same magnet 210 to detect the same magnetic field intensity.

The amplification unit 520 amplifies the magnetic field intensities sensed by each of the plurality of the Hall elements 111a through 111d. The plurality of the Hall elements 111a through 111d are closely positioned inside of the display apparatus 100, thereby a difference between the magnetic field intensities may be too small to be used for sensing the open status of the flip cover 200. The amplification unit 520 may amplify the magnetic field intensity to increase the accuracy of determining the status of the flip cover 200.

The comparison unit 530 compares the magnetic field intensities sensed by the plurality of the Hall elements 111a through 111d. The comparison unit 530 may determine a difference between the magnetic field intensities detected by the plurality of the Hall elements 111a through 111d.

When a difference between the magnetic field intensities detected by the first and second Hall elements 111a and 111b is calculated as a positive value, the comparison unit 530 may determine a status of the flip cover 200 as a front side open status. Herein, the front side open status corresponds to a status where the open angle 130 of the flip cover 200 is more than 0 degree and less than or equal to 180 degrees.

When a difference between the magnetic field intensities detected by the first and second Hall elements 111*a* and 111*b* is calculated as a negative value, the comparison unit 530 may determine a status of the flip cover 200 as a back side open status. Herein, the back side open status corresponds to a status in which the angle of opening 130 of the flip cover 200 is more than 180 degrees and less than or equal to 360 degrees.

The control unit 540 may use the opening status of the flip cover 200 that is determined by the comparison unit 530 for adjusting the user interface or user experience.

The Hall elements 111*a* through 111*d* included in the Hall sensor 110 are used to detect the magnetic field generated from the magnet 210. The Hall elements 111*a* through 111*d* may be arranged in a single Hall sensor 110 as in the example illustrated in FIG. 2. In the alternative, the Hall elements 111*a* through 111*d* may be separately arranged in at least two Hall sensor 110 as illustrated in FIG. 6.

Figure 6:
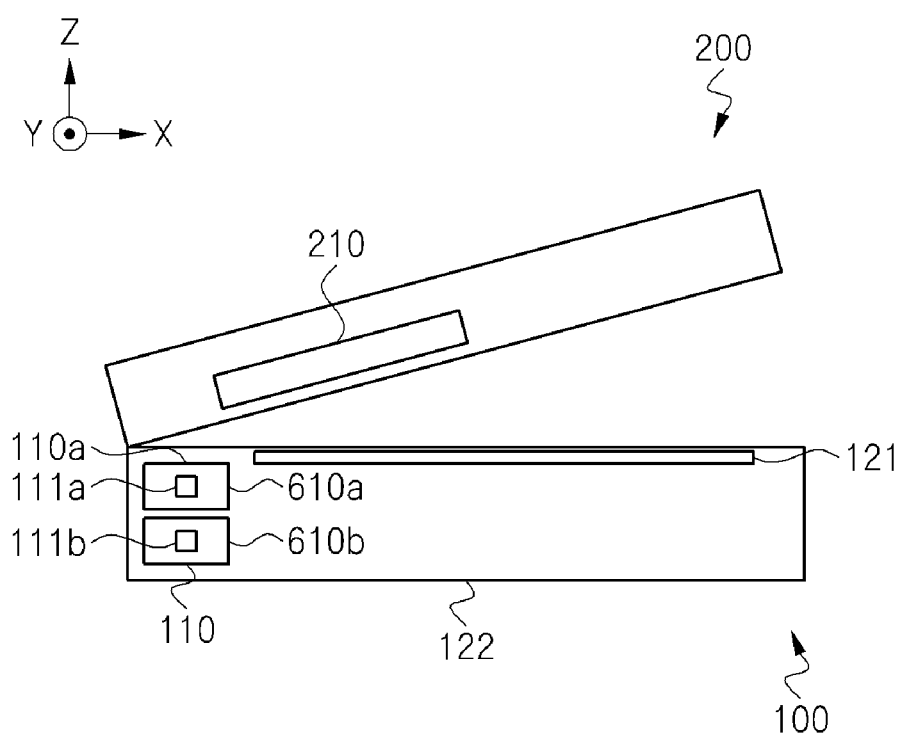
FIG. 6 is a diagram illustrating an example of a display apparatus that includes a plurality of Hall elements separately arranged in a first Hall sensor and a second Hall sensor.

FIG. 6 is a diagram illustrating an example of a terminal in which Hall elements are separately arranged in two or more Hall sensors.

Referring to FIG. 6, the display apparatus 100 may include a first Hall sensor 610*a* and a second Hall sensor 610*b*. The first and second Hall sensors 610*a*, 610*b* respectively include a single Hall element. That is, the first Hall element 111*a* is arranged in the first Hall sensor 610*a*, and the second Hall element 111*b* is arranged in the second Hall sensor 610*b*. The first and second Hall sensor 610*a* and 610*b* is vertically arranged with respect to each other, from a top side to a bottom side.

A first semiconductor die having the first Hall sensor 610*a* and a second semiconductor die having the second Hall sensor 610*b* may be closely arranged with each other to be packaged. The first and second semiconductor dies may be integrally arranged as a single package, or may be separately arranged as two packages. The packages may be horizontally arranged with respect to the display screen 121.

The magnetic field sensing surfaces 110*a* of the first and second Hall sensor 610*a* and 610*b* may be horizontally arranged with respect to the display screen 121. This is because the first and second Hall sensors 610*a* and 610*b* are layered along a Z-axis direction to determine distances between the magnet 210 and the plurality of the Hall elements 111*a* through 111*d*, based on the different values of intensity that may result due to their location along the Z-axis.

The difference between the magnetic field intensities detected by the plurality of the Hall elements 111*a* through 111*d* included in each of the first and second Hall sensors 610*a* and 610*b* may be used for determining the status of the flip cover 200.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

As a non-exhaustive illustration only, a terminal described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blue-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

DESCRIPTION OF SYMBOLS

| | |
|---|---|
| 100: DISPLAY APPARTUS | |
| 110: HALL SENSOR | 110a: MAGNETIC FIELD SENSING SURFACE |
| 111: A PLURALITY OF HALL ELEMENTS | 113: HALL SENSOR CIRCUIT BOARD |
| 115: SENICONDUCTOR PACKAGE CHIP | |
| 117: MAIN CIRCUIT BOARD | |
| 118: LEAD | |
| 120: MAIN BODY | |
| 121: DISPLAY SCREEN | 122: BACK OF DISPLAY APPARATUS |
| 130: OPEN ANGLE | |
| 200: FLIP COVER | 210: MAGNET |
| 220: COVER UNIT | 221: HINGE |
| 510: OFFSET ADJUSTMENT UNIT | 520: AMPLIFICATION UNIT |
| 530: COMPARISON UNIT | 540: CONTROL UNIT |
| 610: FIRST AND SECOND HALL SENSORS | |

What is claimed is:

1. An apparatus comprising:
a display screen positioned in a main body;
a cover unit configured to cover the display screen;
a magnet disposed in or on the cover unit; and
a Hall sensor positioned in the main body, the Hall sensor comprising a plurality of Hall elements positioned such that an axis passing through two of the plurality of Hall elements is substantially perpendicular to the display screen,
wherein each of the two of the plurality of Hall elements is configured to measure a magnetic field of the magnet.

2. The apparatus of claim 1, wherein the plurality of the Hall element is formed on a semiconductor substrate; and
a first conductivity type contact region and a second conductivity type doping region are formed on a first conductivity type well of the semiconductor substrate.

3. The apparatus of claim 2, wherein the first conductivity type contact region is an N-type contact region;
the second conductivity type doping region is a P-type doping region; and
the first conductivity type well is an N well of the semiconductor substrate.

4. The apparatus of claim 1, further comprising:
an offset adjustment unit configured to determine a reference value for a magnetic field intensity detected by each of the plurality of the Hall elements;
an amplification unit configured to amplify the magnetic field intensity detected by each of the plurality of the Hall elements; and
a comparison unit configured to compare the detected magnetic field intensity through each of the plurality of the Hall elements.

5. The apparatus of claim 1, wherein a number of the Hall elements is equal to 2 or more.

6. The apparatus of claim 1, wherein the Hall sensors are positioned on a Hall sensor circuit board, and the Hall sensor circuit board is positioned in a packaged chip.

7. The apparatus of claim 6, wherein the Hall sensor circuit board is arranged substantially perpendicular to the display screen.

8. The apparatus of claim 1, wherein the Hall sensor further comprises a magnetic field sensing surface disposed substantially parallel to the plurality of Hall sensors.

9. The apparatus of claim 1, wherein the Hall sensor detects whether the cover is substantially above the display screen or substantially below the display screen.

10. An apparatus comprising:
a display terminal comprising a display screen;
a first Hall sensor comprising a first Hall element; and
a second Hall sensor comprising a second Hall element,
wherein the first Hall sensor and the second Hall sensor are positioned in the display terminal and are vertically arranged with respect to each other and the display screen, and wherein the display screen is arranged substantially parallel to a surface of the first Hall sensor and a surface of the second Hall sensor such that a magnetic field of a magnet passing through the surface of the first Hall sensor and the surface of the second Hall sensor is respectively sensed by the first Hall sensor and the second Hall sensor.

11. The apparatus of claim 10, wherein the first Hall element and the second Hall element are on a semiconductor substrate; and
a first conductivity type contact region and a second conductivity type doping region are formed on a first conductivity type well of the semiconductor substrate.

12. The apparatus of claim 11, wherein the first conductivity type contact region is an N-type contact region; the second conductivity type doping region is a P-type doping region; and the first conductivity type well is an N well of the semiconductor substrate.

13. The apparatus of claim 10, wherein the first Hall sensor is layered above or below the second Hall sensor.

14. The apparatus of claim 10, further comprising:
a cover in which the magnet is positioned; and
a processor configured to determine whether the cover is open or closed based on magnetic fields detected by the first Hall sensor and the second Hall sensor.

15. The apparatus of claim 10, wherein the first Hall sensor, the second Hall sensor, and the display screen are arranged in a main body.

16. The apparatus of claim 15, wherein the display screen is horizontally arranged in the main body, and the first Hall sensor and the second Hall sensor are vertically arranged in the main body.

17. A method of determining a status of a cover of a display terminal, the display terminal including at least two Hall sensors, the method comprising:
- detecting a first magnetic field intensity by using a first Hall sensor;
- detecting a second magnetic field intensity by using a second Hall sensor, the first Hall sensor and the second Hall sensor arranged vertically inside the display terminal and arranged perpendicular to a main surface of the display screen;
- comparing the first magnetic field intensity and the second magnetic intensity; and
- determining whether the cover is open or closed based a result of the comparing.

\* \* \* \* \*